US007301303B1

(12) United States Patent
Hulden

(10) Patent No.: US 7,301,303 B1
(45) Date of Patent: Nov. 27, 2007

(54) PORTABLE BATTERY JUMP START IN A SOFT-SIDED CARRYING CASE

(75) Inventor: Richard M. Hulden, Taylors, SC (US)

(73) Assignee: International Specialty Services, Inc., Greenville, SC (US)

( * ) Notice: Subject to any disclaimer, the term of this patent is extended or adjusted under 35 U.S.C. 154(b) by 274 days.

(21) Appl. No.: 11/201,538

(22) Filed: Aug. 11, 2005

Related U.S. Application Data

(60) Provisional application No. 60/601,799, filed on Aug. 16, 2004.

(51) Int. Cl.
*H02J 7/00* (2006.01)
*H02J 7/14* (2006.01)

(52) U.S. Cl. .............. 320/105; 320/103; 320/104; 320/107; 320/109; 320/110; 429/90; 429/96; 429/116; 429/123; 439/500; 439/765

(58) Field of Classification Search .............. 320/104, 320/105, 107, 109, 110, 103; 429/90, 96, 429/116, 123; 439/500, 765
See application file for complete search history.

(56) References Cited

U.S. PATENT DOCUMENTS

| 4,215,306 | A | * | 7/1980 | Mace ............... 320/105 |
| D284,957 | S | | 8/1986 | Bates |
| D285,063 | S | | 8/1986 | Bates |
| 4,983,473 | A | | 1/1991 | Smith |
| 5,214,368 | A | * | 5/1993 | Wells ............... 320/105 |
| 5,922,490 | A | | 7/1999 | Kump |
| 5,985,481 | A | * | 11/1999 | Champagne et al. ... 429/90 |
| 6,002,235 | A | * | 12/1999 | Clore ............... 320/105 |
| 6,222,342 | B1 | * | 4/2001 | Eggert et al. ....... 320/105 |

(Continued)

FOREIGN PATENT DOCUMENTS

JP    2003012852    1/2003

(Continued)

OTHER PUBLICATIONS

Federated Auto Parts Catalog; 4th page, 10th page.

*Primary Examiner*—Bao Q. Vu
*Assistant Examiner*—Jue Zhang
(74) *Attorney, Agent, or Firm*—Dority & Manning, P.A.

(57) ABSTRACT

A portable battery jump start having a case having soft sides and a soft top cover configured to be selectively closed and opened. The sides of the case are joined to one another by seams that may be taped to become watertight. A first seal is configured for selectively connecting the top cover to the sides. The first seal can include a waterproof zipper. A rigid insert member is disposed inside the case and defines a center compartment, a left compartment and a right end compartment. A battery is snuggly disposed in the center compartment. Each clamp in a pair of electrical clamps is connected to the battery by one of the cables in a pair of cables and stored in one of the end compartments. A control module is disposed in the center compartment and electrically connected to the battery so as to permit selective supply of electricity from the battery to the cables. The battery and control module are protected from impact by being surrounded top and bottom with various pads and around the sides by the insert member.

19 Claims, 4 Drawing Sheets

U.S. PATENT DOCUMENTS

| | | |
|---|---|---|
| 6,254,426 B1 | 7/2001 | Iacovelli et al. |
| 6,356,050 B1 * | 3/2002 | Hussaini ..................... 320/105 |
| 6,565,381 B1 * | 5/2003 | Chou ......................... 439/501 |
| 6,596,434 B1 | 7/2003 | Yoshinaka et al. |
| 6,604,618 B1 | 8/2003 | Godshaw et al. |
| 6,677,076 B2 | 1/2004 | Nakahara et al. |
| D506,724 S | 6/2005 | Hriscu et al. |
| D511,491 S | 11/2005 | Hriscu et al. |
| 2002/0041174 A1 * | 4/2002 | Purkey ....................... 320/103 |
| 2002/0121877 A1 * | 9/2002 | Smith e al. ................. 320/103 |
| 2003/0210015 A1 * | 11/2003 | Levine et al. ............... 320/105 |
| 2004/0239290 A1 * | 12/2004 | Krieger ...................... 320/105 |

FOREIGN PATENT DOCUMENTS

| | | |
|---|---|---|
| WO | WO 00/68701 | 11/2000 |

* cited by examiner

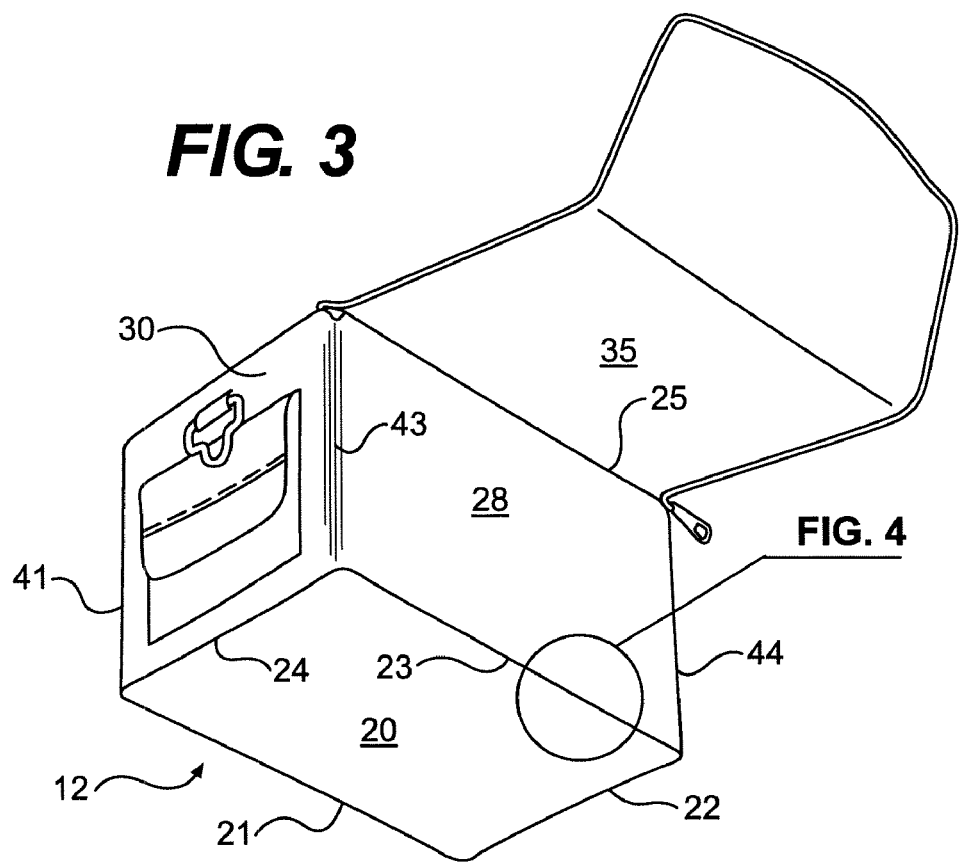
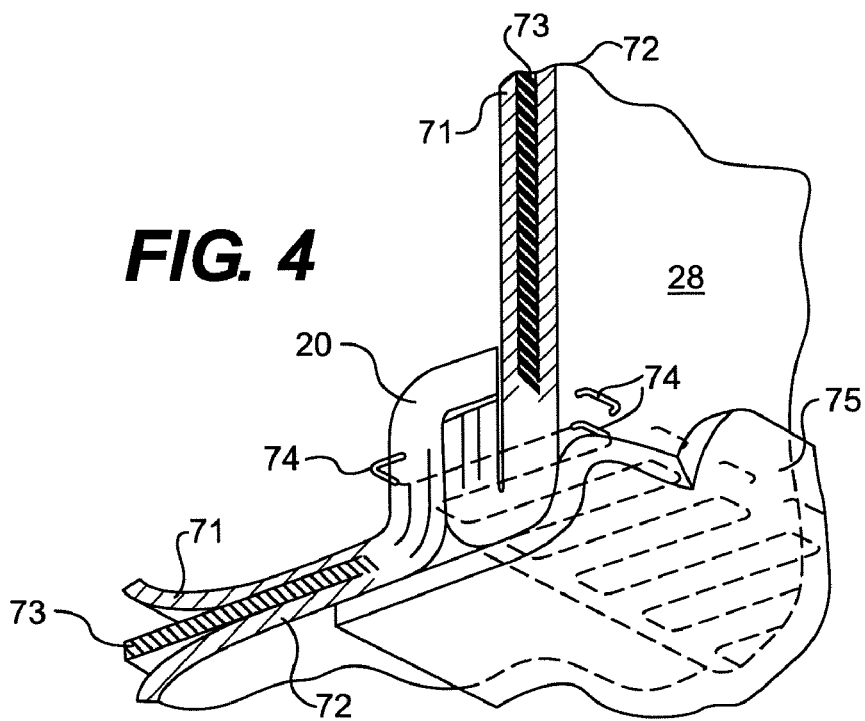

PORTABLE BATTERY JUMP START IN A SOFT-SIDED CARRYING CASE

CROSS-REFERENCE TO RELATED APPLICATIONS

The present application claims priority to currently pending U.S. Provisional Patent Application No. 60/601,799, filed Aug. 16, 2004.

STATEMENT REGARDING FEDERALLY SPONSORED RESEARCH OR DEVELOPMENT

N/A

BACKGROUND OF THE INVENTION

The present application concerns a portable battery jump start.

Portable battery jump starts (a.k.a. battery jumpers) currently in the market have numerous drawbacks. For example, they have hard cases, which are easy to damage when dropped, as they transfer to internal components of the battery jumper most of the shock from the collision with the ground. The collision also can damage the hard case itself. The rigidity of the hard case renders it cumbersome to store due to the inability to modify its shape to fit the shape of the storage space. The hard case is slippery. And if it is left unsecured, it slides around in the trunk of a vehicle. Most current hard shelled case designs have exposed jumper leads, which can tangle in storage; are esthetically unattractive; and can transfer grime from cables/clamps to other items in the storage area of the vehicle in which it is carried. Due to the nature of its use, the battery jumper may be exposed to the elements—rain, sleet or snow. The moisture from such inclement weather penetrates the hard case and can cause damage and may cause a malfunction or inability to use the battery jumper, as well as raising safety concerns.

OBJECTS AND SUMMARY OF THE INVENTION

It is a principal object of the present invention to provide a portable battery jumper in which the power unit and electrical components are housed in a soft shell, padded case that facilitates storage of the battery jumper.

It is another principal object of the present invention to provide a portable battery jumper in which the power unit and electrical components are housed in a padded, soft-shell case.

It is yet another principal object of the present invention to provide a portable battery jumper in which the power unit and electrical components are housed in a padded, soft shell case that is water-resistant or in some cases waterproof.

It is a further principal object of the present invention to provide a portable battery jumper in which the power unit and electrical components are housed in a soft shell, padded case having an inside pocket that contains the jumping cables so that the jumping cables are not visible from the exterior and are kept from getting tangled and from soiling articles which might brush into the case in storage.

It is still another principal object of the present invention to provide a portable battery jumper in which the power unit and electrical components are housed in a watertight case that provides shock resistance to internal components of the battery jumper unit and allows recovery if the unit should be dropped into water and thereby increases the useful life of the unit in marine environments.

It is yet a further principal object of the present invention to provide a portable battery jumper in which the power unit and electrical components are housed in a water-resistant, soft-sided case that can be made in a visually attractive style, broadening its market appeal.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a portable battery jumper in a soft-sided carrying case is described in the accompanying drawings and in the text below.

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

BRIEF DESCRIPTION OF THE DRAWINGS

FIG. 3 is an elevated perspective view of the case of a presently preferred embodiment of the battery jump start of the present invention taken from beneath and behind the case with the left panel in the foreground and the case opened.

FIG. 4 schematically shows an expanded view taken within the solid line circle that is designated 4 in FIG. 3, partially in perspective and partially in cross-section with portions of the stitching shown in phantom (dashed line).

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
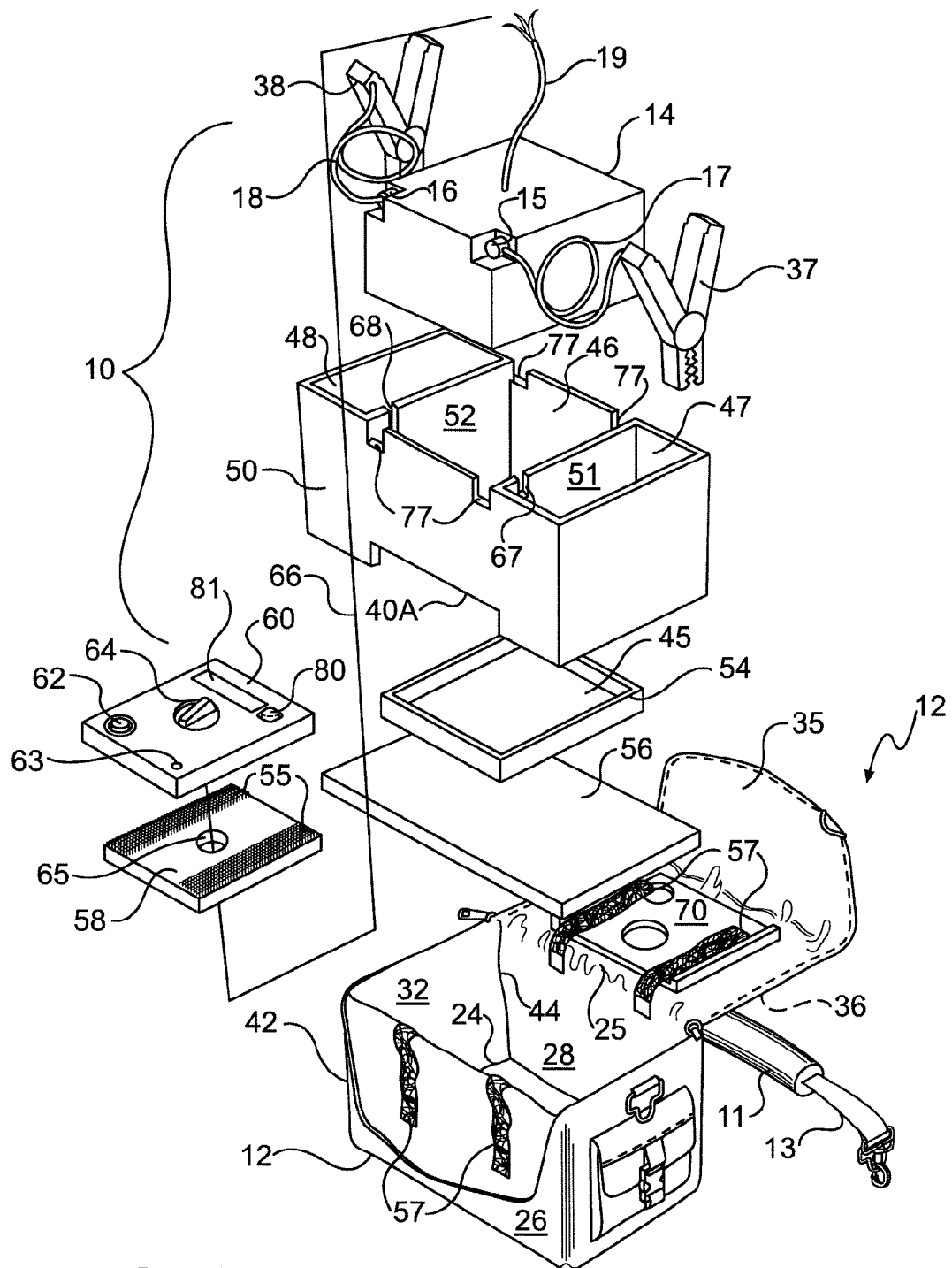
FIG. 1 is an elevated perspective view showing assembly of components of a presently preferred embodiment of the battery jump start of the present invention.

A presently preferred embodiment of the portable jump start of the present invention is shown in FIG. 1 and is represented generally by the numeral 10. As shown in FIG. 1, the portable battery jump start comprises a case that is designated generally by the numeral 12. As shown in FIG. 3 for example, the case 12 includes a bottom panel 20, which is bounded by four edges that can be arranged to generally form a rectangular shape. In the exemplary embodiment that is illustrated, the shape of the bottom panel 20 is a rectangle that has two shorter opposed ends than each of the two other sides. However, it is also possible for the shape of the bottom panel to be square or oval.

Figure 2A:
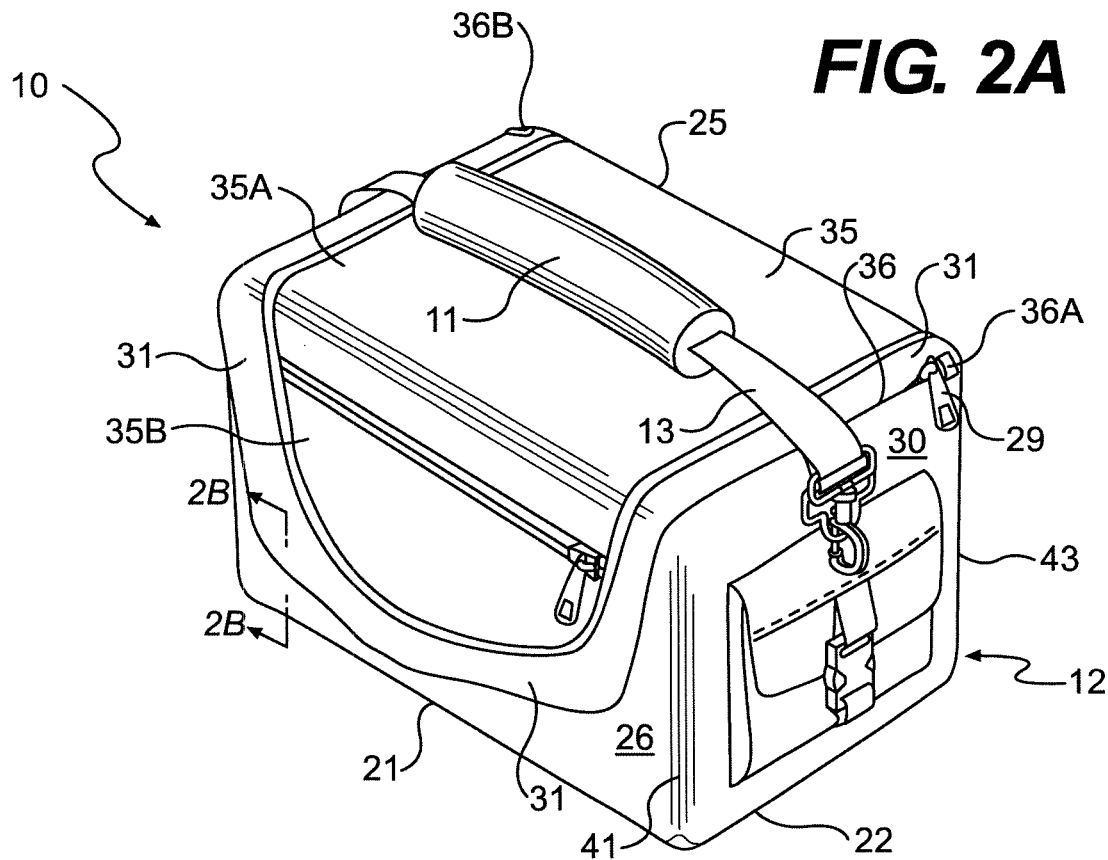
FIG. 2A is an elevated perspective view showing a presently preferred embodiment of the battery jump start of the present invention with the case closed.

As shown in FIG. 3, which shows a view of the case from beneath the bottom panel 20 and from the rear panel 28, the bottom panel 20 has a front edge 21, a back edge 23 that is disposed opposite the front edge, a left edge 22 extending between the front and back edges, and a right edge 24 that is disposed opposite the left edge 22 and extends between the front and back edges. As shown in FIG. 2C, the case further includes a front panel 26 that extends generally in a plane that is disposed normally to the bottom panel 20 and from the front edge 21 thereof. As shown in FIG. 3, the case further includes a back panel 28 that extends from the back edge 23 and generally in a plane that is disposed normally to the bottom panel 20. As shown in FIG. 2A, the case further includes a left panel 30 that extends vertically from the left edge 22. As shown in FIG. 2A, the case further includes a right panel 32 that extends vertically from the right edge 24 and is the mirror image of the left panel 30. As shown in FIG. 3 for example, the case 12 further includes a top edge 25 that partially defines the back panel 28 and extends between the left panel 30 and the right panel.

As shown in FIGS. 1, 2A, 2C and 3, the case further includes a top cover 35 that extends from the top edge 25 of the back panel 28. The top cover 35 is flexibly hinged along the top edge 25 to the back panel 28 of the case 12. As shown in FIGS. 2A and 2C, the top cover 35 of the case 12 is configured to be selectively closed (FIG. 2A) and opened (FIG. 2C) so as to selectively close and open the case, respectively. As shown in FIG. 2C, the top cover 35 of the case 12 has a lid portion 35A that is integral (and desirably unitary) with a front flap 35B. The lid portion 35A selectively covers and uncovers the opening into the case 12. As shown in FIG. 2A, the front flap 35B overlaps a portion of the front panel 26 when the cover 35 is disposed to close the case 12.

The top cover 35 and the panels 20, 28, 30, 32 of the case 12 desirably are made from materials that are water-impermeable. FIG. 4 schematically shows an expanded view that is partially in cross-section and taken within the dashed circle that is designated 4 in FIG. 3. As schematically shown in FIG. 4, each panel 20, 28, 30, 32 and the cover 35 desirably is formed as a laminate that includes an inner sheet 71 that faces the interior of the case, an outer sheet 72 that faces the exterior of the case, and a middle sheet 73 that is disposed between the inner sheet 71 and the outer sheet 72. Each of the inner and outer sheets desirably can be made from a ballistic nylon material of a grade that is typically found in high-end bags, briefcases and suitcases. This material is rip resistant and very strong (able to withstand at least 200 pounds per square inch) to withstand the wear and tear of daily use, and also to support the weight of the internal battery. One such material is sold under the GORE-TEX® brand by W. L. Gore & Associates, Inc. of Newark, Del. The outer sheet 72 of this case 12 could also include exterior leather or other material to enhance the visual appearance. The middle sheet 73 desirably is formed of a butyl rubber membrane. Other materials that can be used to form the panels would include neoprene, polyurethane, polyethylene and polyvinyl chloride.

As shown in FIG. 2C, the front panel 26 of the case 12 can be integrally formed with the left panel 30 so as to define a first edge where the two panels 26, 30 meet with the plane of each panel disposed at a right angle with respect to the plane that defines the other panel. Similarly, as shown in FIG. 1, the front panel 26 of the case 12 can be integrally formed with the right panel 32 so as to define a second edge where the two panels 26, 32 meet with the plane of each panel disposed at a right angle with respect to the plane that defines the other panel. As shown in FIG. 3, the back panel 28 can be integrally formed with the left panel 30 so as to define a third edge where the two panels 28, 30 meet with the plane of each panel disposed at a right angle with respect to the plane that defines the other panel. Similarly, as shown in FIG. 1, the back panel 28 can be integrally formed with the right panel 32 so as to define a fourth edge where the two panels 28, 32 meet with the plane of each panel disposed at a right angle with respect to the plane that defines the other panel.

One suitable way of integrally forming these panels is by connecting the edges of adjacent panels with seams. For example, as shown in FIG. 2C, the first edge can define a first seam 41 connecting the front panel 26 and the left panel 30 of the case 12. As shown in FIG. 1, a second seam 42 can define the second edge that connects the front panel 26 and the right panel 32. As shown in FIG. 3, the third edge can be defined by a third seam 43 that connects the back panel 28 and the left panel 30. As shown in FIG. 1, the fourth edge can be defined by a fourth seam 44 that connects the back panel 28 and the right panel 32. Similarly, additional seams connect the bottom panel to each of the front panel, rear panel, left panel and right panel and the cover 35 to the rear panel 28. In each instance, the panels are integrally formed so as to be water-resistant.

In an alternative embodiment, the panels are integrally formed so as to be watertight. One way of integrally forming the panels so as to be watertight is to connect the edges of adjacent panels with taped seams. An alternative way of integrally forming these panels is by forming them from a unitary sheet of material that is molded to the desired shape. Such unitary sheet can be formed as an extruded hollow, flexible tube that is cut to the desired height of the panels.

FIG. 4 schematically shows two of the panels 20, 28 being joined at one of the seams 23. As schematically shown in FIG. 4, at each seam that joins each two adjacent panels, one of the edges of one of the panels desirably can be folded over onto itself, and the edge of the other panel is desirably overlapped onto the folded edge. As shown in FIG. 4, the seam is then desirably double stitched, which desirably can be done with nylon thread 74 (shown partially in phantom). Finally, if a watertight case is desired, then about a one inch wide strip of waterproof tape 75 can be bonded over the two adjacent panel edges that have been double stitched together. The waterproof tape 75 is shown partially peeled back in FIG. 4 to facilitate understanding of this aspect of the embodiment shown therein. The bonding of the tape 75 over the seam to form a taped seam can be accomplished in any of several conventional ways, including chemically or by heat sealing.

A first seal is configured for selectively connecting the top cover 35 to each of the front panel 26, the left panel 30 and the right panel 32. The first seal can be provided by a zipper that forms a water-resistant seal. Alternatively, this first seal can be made water-tight by choosing an appropriately rated waterproof zipper. As shown in FIGS. 2A and 2C, such a first seal is desirably provided by the inclusion of a waterproof zipper 36 to form a watertight seal. As shown in FIG. 2A, the zipper 36 has a closed end 36A, 36B at each if it's opposite ends and includes a puller 29 that can be grasped and tugged by the user in one of two opposite directions to zip and unzip the zipper 36. Any of a number of waterproof zippers will work well depending on the desired level of water impermeability. A selection of suitable waterproof zippers is available from YKK Europe Limited, 61 Central Street London EC1V 8AN United Kingdom.

Figure 2B:
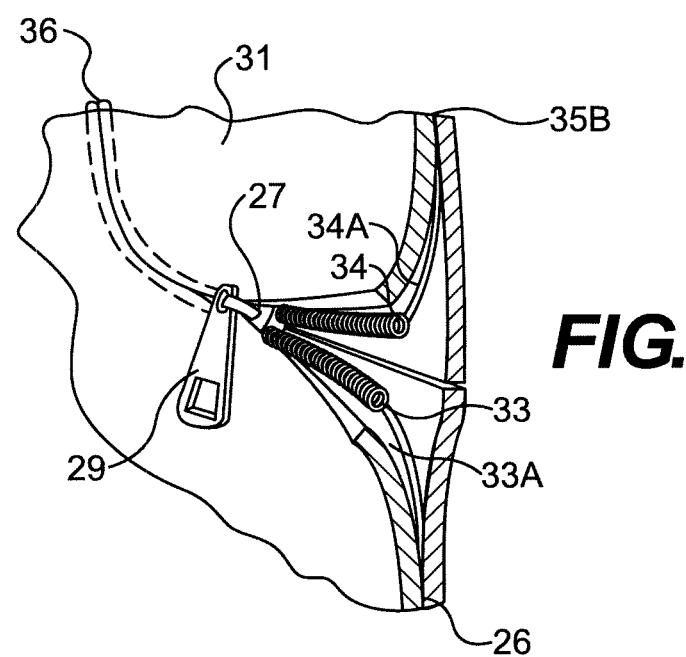
FIG. 2B is a partial cross-sectional view and partial perspective view of a portion of a presently preferred embodiment of the battery jump start of the present invention taken along the lines 2B-2B in FIG. 2A.
Figure 2C:
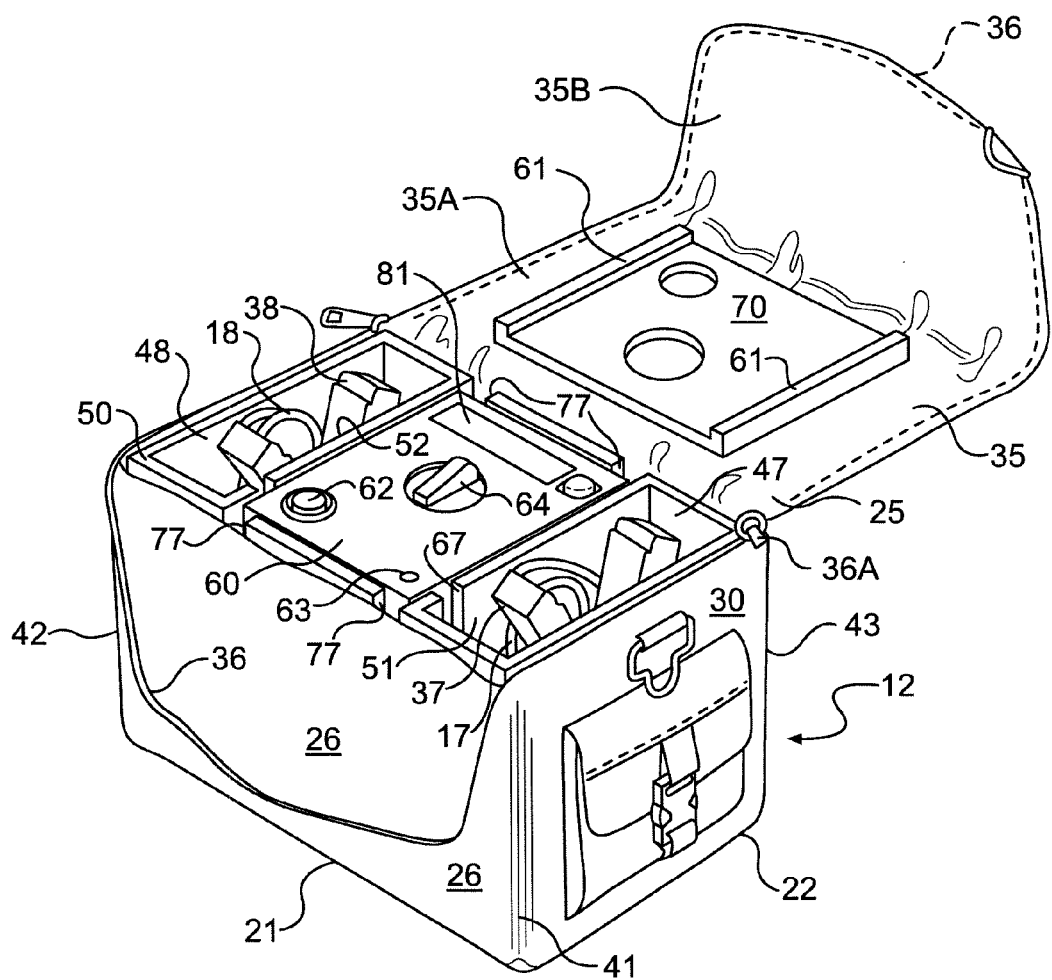
FIG. 2C is an elevated perspective view of a presently preferred embodiment of the battery jump start of the present invention with the case opened.

FIG. 2B schematically shows a partial cross-section of a waterproof zipper 36 that is taken in the direction of the arrows labeled 2B-2B in FIG. 2A. The zipper 36 includes a slider 27, a puller 29 that is pivotally attached to the slider 27, and the outer elements 33 and the inner elements 34 mounted on the respective base tape ends 33A, 34A. Additionally, as shown in FIG. 2A, the cover 35 can be defined by a border portion 31 that is configured to outline the free edge of the cover 35 and to include the base tape ends 34A of the inner elements 34 of the zipper 36. This border portion 31 allows use of different materials than the materials that form the largest area of the cover 35. Such different materials may be better suited to forming the base tape of the zipper that is most desired by the manufacturer of the zipper.

As shown in FIGS. 1 and 2C, the portable battery jump desirably includes a rigid insert member that is generally designated by the numeral 50. Desirably, as shown in FIG. 1, the insert member 50 defines a center compartment 46 having a left side wall 51 and a right side wall 52 that is disposed opposite to the left side wall 51. The insert member 50 desirably further defines a left end compartment 47 that is partly defined by the left side wall 51. The insert member 50 further desirably defines a right end compartment 48 that is partly defined by the right side wall 52. As shown in FIG. 2C for example, the insert member 50 is disposed inside the case 12 and oriented with the left end compartment 47 near the left panel 30 of the case 12 and the right end compartment 48 near the right panel.

The insert member 50 desirably is formed of ethyl vinyl acetate (EVA) foam, which will provide a firm, but impact-absorbing cushion to the battery and components of the jump start. This EVA foam desirably has a density between about two and about four pounds per cubic foot with a compression deflection of about to about five to about nine (+/−2) pounds per square inch, a tensile strength in the range of about 50 to about 80 pounds per square inch, a percentage elongation of about 250% and a water absorption of less than five percent change in weight. The EVA foam is desirably selected for excellent chemical resistance to alkali, acid, gasoline and oil, aromatic hydrocarbons, ketones, oxidation and ozone. Use of this style foam will afford the ability to absorb impact with little or no damage to the battery jump start's components. Suitable EVA foam is available from Lamatek, Inc., 1805 Bridgeboro Road, Edgewater Park, N.J. 08010. Other types of cushioning material with similar performance characteristics also can be used in place of the EVA foam.

As shown in FIG. 1, the portable jump start of the present invention includes a battery 14 that has a pair of terminals 15, 16. The position of each terminal of the battery 14 can be located to suit the size and type of the battery. Desirably, the battery 14 is a spill proof battery, as this attribute renders the portable jump start capable of being stored in any position without risk of damage from acid leaking. The portable jump start could also be made with a spiral wound battery, which would even further enhance the spill proof/leak proof capabilities and make this portable jump start even safer.

As shown in FIG. 1, the portable battery jump start desirably includes a thin, rigid sheet of planar material 56 that will be disposed to rest flat on top of the bottom panel 20 of the case 12. The rigid sheet of planar material 56 will be disposed inside the case 12 and has a flat lower surface that covers substantially the entire area of the bottom panel 20 of the case 12. The rigid sheet of planar material 56 can be formed of fiberboard, wood, plastic, masonite, or the like, as long as it is reasonably lightweight and sturdy, given the weight of the battery that is to be disposed inside the case. The rigid sheet of planar material 56 desirably can be attached to the bottom panel 20 by adhesives.

As shown in FIG. 1, the portable battery jump start desirably includes a base pad 54. As shown in FIG. 1, the base pad 54 will be disposed inside the case 12 and has a flat bottom that will rest on top of the flat upper surface of the rigid sheet of planar material 56 that covers the bottom panel 20 of the case 12. The bottom of the base pad 54 can be attached to the flat upper surface of the rigid sheet of planar material 56 by any conventional means such as adhesive for example. Alternatively, the base pad 54 can be placed on the rigid sheet of planar material 56 without being attached to it, as the insert member 50 can hold the base pad 54 in place within the center compartment of the insert member 50. A recess 45 is formed in the upper surface of the base pad 54 and configured to receive therein the bottom portion of the battery in a snug fit. The base pad 54 is rigid enough so as not to be compressed by the weight of the battery 14 that is to be carried within the recess 45 atop the base pad 54. The base pad 54 can be formed of EVA foam suitable for this purpose.

As shown in FIG. 1, a pair of cables 17, 18 is provided. Each cable is electrically conducting and has a pair of opposite ends. One end of each cable 17, 18 is disposed in selective electrical communication with a separate respective one of the terminals 15, 16 (positive or negative) of the battery 14. The other end of each cable 17, 18 is electrically connected, respectively, to an electrically conducting clamp 37, 38 to transfer power from the battery 14 to the device or vehicle needing battery boosting.

As shown in FIG. 2C, one of the clamps 37 is storable in the left end compartment 47 of the insert member 50, and the other of the clamps 38 is storable in the right end compartment 48 of the insert member 50. In this way it is easier to prevent the clamps 37, 38 from accidentally touching each other and causing a short circuit. Each respective cable 17, 18 is also stored in the same end compartment as the clamp 37, 38 to which it is attached.

As shown in FIG. 1, the insert member 50 can include a front cutout 40A that is configured to receive the front edge of the base pad 54 when the insert member 50 is disposed into the case 12. Similarly, the insert member 50 can include a rear cutout (not visible in the views shown in the Figs.) that is the mirror image of the front cutout 40A and that receives the rear edge of the base pad 54 when the insert member 50 is disposed into the case 12. As schematically shown in FIG. 1, when the battery 14 is received in the recess 45 of the base pad 54 and disposed into the center compartment 46 of the insert member 50, a left side notch 67 in the left wall 51 of the insert member 50 allows passage of the cable 17 from the battery terminal 15 to the left side compartment 47 of the case where the clamp 37 is stored when not in use. Similarly, a right side notch 68 in the right wall 52 of the insert member 50 allows passage of the cable 18 from the battery terminal 16 to the right side compartment 48 of the case where the clamp 38 is stored when not in use.

The portable jump start desirably further includes a control module 60. As shown in FIGS. 1 and 2C for example, the control module 60 desirably is disposed in the center compartment 46 of the insert member 50. The control module 60 is electrically connected to the battery 14 via a cable 19, which can include a plurality of electrical leads for facilitating control of various modes of operation of the battery 14 via the control module 60. In one of those modes of operation, the control module 60 is electrically configured to permit the operator to selectively supply electricity from the battery 14 to the electrically conducting clamps 37, 38 via the cables 17, 18.

As shown in FIG. 1, a buffer pad 58 desirably is disposed between the battery 14 and the control module 60. Though not visible in the view shown in the Figs., the underside of the buffer pad 58 is configured to receive the top of the battery 14. A feed through opening 65 is provided through the buffer pad 58 to permit the cable 19 to pass through the buffer pad 58 to connect the battery 14 and the control module 60 as schematically indicated in FIG. 1 by the solid line designated 66. In one embodiment shown in FIG. 1, pairs of strips 57 of hook and loop fasteners have one end anchored on the inside of the front panel 26 and the rear panel 28 opposite each other, and the opposite end of each strip 57 in each pair is free. When the underside of the buffer pad 58 is disposed on top of the battery 14, the strips 57 anchored on the front panel 26 are laid tautly on top of the buffer pad 58. The opposed strips 57 in each aligned pair anchored on the rear panel 28 is then tautly laid partially on top of the buffer pad 58 and partially so as to engage the paired complementary strip 57 of hook and loop fasteners that is provided on the upper surface of the buffer pad 58. Desirably, the strips 57 are provided with hook and loop fasteners on both opposite surfaces of the strips 57. Thus, it is possible to reverse the order of the strips 57 that are first disposed tautly across the top of the buffer pad 58 and begin with the ones anchored on the rear panel 28.

As shown in FIG. 1, the upper side of the buffer pad 58 is configured to receive the bottom of the control module 60. As shown in FIG. 1, the upper side of the buffer pad 58 is provided with strips 55 of hook and loop fasteners to engage complementary strips of hook and loop fasteners that are provided on the underside (not shown in FIG. 1) of the control module 60. The buffer pad 58 is desirably formed of EVA foam and shields both the control module 60 and the battery 14 from harm that otherwise might occur during an impact.

Additionally, as shown in FIG. 1, a cushion pad 70 desirably is connected to the top cover 35 and configured to cover the control module 60 when the top cover 35 is disposed in the closed orientation. The cushion pad 70 desirably is provided with side flanges 61 that are received in the pairs of aligned slots 77 that are formed in the front and rear walls of the insert member 50 when the cover 35 is closed. The cushion pad 70 also is desirably formed of EVA foam and further shields both the control module 60 and the battery 14 from harm that otherwise might occur during an impact when the case 12 is closed. Accordingly, the case 12 is amply padded at the bottom panel 20 by the base pad 54, at the front panel 26 and back panel 28 by the respective front and rear walls of the insert member 50, between the battery 14 and the control panel 60 by the buffer pad 58, and between the control panel 60 and the top cover 35 by the cushion pad 70 to provide resistance to physical impacts to the battery 14 and other electrical components housed in the control panel 60.

The portable jump start of the present invention is thus especially desirable for use in the marine or camping/RV markets. For if the portable jump start of the present invention were to be dropped onto the dry ground or overboard into the water, both the cushioning and waterproofing features of the case 12, insert member 50 and pads 54, 58, 70 would protect the battery 14 and associated electrical components from damage.

As shown in FIG. 2C, the portable battery jump start desirably further includes a 12 Volt receptacle 62 that is mounted in the control module 60, which is configured so that the operator can selectively connect the 12 Volt receptacle 62 electrically to the battery 14. Thus, the control module 60 is configured to selectively allow the battery 14 to power the 12 Volt receptacle 62, thereby permitting the operator to employ the battery to power a 12V DC appliance. Additionally, the 12 Volt receptacle 62 allows the powering of a 12 Volt-to-110 Volt AC converter (not shown). Thus, the 12 Volt receptacle 62 can be connected electrically a 12 Volt-to-110 Volt AC converter to power a 110 Volt AC appliance. This capability is very useful for emergency power, portable power and camping needs.

The portable battery jump start desirably further includes an AC-to-DC charger. As embodied herein and shown for example in FIG. 2C, an AC-to-DC charger is desirably mounted in the control module 60 and has a plug 63 for connection thereto. The control module 60 is configured so that it enables the operator to selectively connect the AC-to-DC charger electrically to the battery 14 via the plug 63 that is mounted in the control module and connected electrically to the AC-to-DC charger. In this way, the control module 60 is configured to selectively allow the battery 14 to be recharged when the AC-to-DC charger is connected electrically to normal household AC current via plug 63. As shown in FIG. 2C, the control module 60 is further desirably provided with an on/off switch 64. A toggle switch 80 controls what is displayed on the display field 81, which can be an LED display or an analog display, as desired. The controller within the control module 60 can be programmed to display voltage, amperage, or the like, on the display field 81, as desired in the particular model of the jump-start.

As shown in FIG. 2A, the soft case 12 includes a handle 13 that is selectively detachable at each opposite end to one of the left panel 30 or right panel 32. Any of a number of different types of conventional selectively detachable connecting mechanisms can be used on the ends of the handle 13 and at the anchor points of the left panel 30 and the right panel 32. The handle 13 desirably is provided with an ergonomically sized and configured grip 11 that desirably is disposed near the center thereof to facilitate comfortably carrying the weight of the jump start by the user.

While at least one presently preferred embodiment of the invention has been described using specific terms, such description is for illustrative purposes only, and it is to be understood that changes and variations may be made without departing from the spirit or scope of the following claims.

What is claimed is:

1. A portable battery jump start, comprising:
    a case, said case including a bottom panel, said bottom panel being bounded by four edges that combine to define a rectangle and include a front edge, a back edge disposed opposite said front edge, a left edge extending between said front and back edges, and a right edge disposed opposite said left edge and extending between said front and back edges, said case further including a front panel extending vertically from said front edge, a back panel extending vertically from said back edge, a left panel extending vertically from said left edge, and a right panel extending vertically from said right edge, said case further including a top edge defining said back panel and extending between said left panel and said right panel and disposed opposite said back edge;

said case further including a first seam connecting said front panel and said left panel, a second seam connecting said front panel and said right panel, a third seam connecting said back panel and said left panel, and a fourth seam connecting said back panel and said right panel;

said case further including a top cover extending from said top edge of said back panel and being configured to be selectively closed and opened;

a first seal configured for selectively connecting said top cover to each of said front panel, said left panel and said right panel;

a rigid insert member, said insert member defining a center compartment having a left side wall and a right side wall opposed to said left side wall, said insert member defining a left end compartment including said left side wall, said insert member defining a right end compartment including said right side wall, said insert member being disposed inside said case and oriented with said left end compartment near said left panel and said right end compartment near said right panel;

a battery having a pair of terminals, said battery being snuggly disposed in said center compartment of said insert member;

a pair of cables, each said cable being electrically conducting and having a pair of opposite ends, one said end of each said cable being in selective electrical communication with a separate one of said terminals;

a pair of electrical clamps, each of said clamps being in electrical communication with a separate one of the other end of each said cable, one of said clamps being storable in said left end compartment of said insert member and the other of said clamps being storable in said right end compartment of said insert member; and a control module, said control module being disposed in said center compartment of said insert member and electrically connected to said battery, and said control module being electrically configured to permit selective supply of electricity from said battery to said cables.

2. A portable battery jump start as in claim 1, wherein:
said first edge defines a first seam connecting said front panel and said left panel, said second edge defines a second seam connecting said front panel and said right panel, said third edge defines a third seam connecting said back panel and said left panel, and said fourth edge defines a fourth seam connecting said back panel and said right panel.

3. A portable battery jump start as in claim 1, further comprising:

a 12 Volt receptacle mounted in said control module and selectively connected electrically to said battery, said control module being configured to selectively allow said battery to power said 12 Volt receptacle thereby permitting said battery to power a 12V DC appliance and to be connected electrically a 12V to 110 V AC converter to power a 110 V AC appliance.

4. A portable battery jump start as in claim 1, further comprising:

an AC-to-DC charger mounted in said control module and selectively connected electrically to said battery, said control module being configured to selectively allow said battery to be recharged when said AC-to-DC charger is connected electrically to normal household AC current.

5. A portable battery jump start as in claim 1, wherein said battery is a spiral wound battery.

6. A portable battery jump start as in claim 1, wherein each of said panels and said top cover of said case being formed of material that is both waterproof and has a tensile strength of at least 200 pounds per square inch.

7. A portable battery jump start as in claim 1, wherein said first seal includes a water proof zipper.

8. A portable battery jump start as in claim 1, wherein each of said seams is a waterproof seam rated up to at least 200 pounds per square inch.

9. A portable battery jump start as in claim 1, wherein said insert member is formed of EVA foam.

10. A portable battery jump start as in claim 1, further comprising:

a cushion pad connected to said top cover and configured to cover said control module when said top cover is disposed in said closed orientation.

11. A portable battery jump start as in claim 10, wherein said cushion pad is formed of EVA foam.

12. A portable battery jump start as in claim 1, further comprising:

a base pad disposed in said center compartment between said bottom panel and said battery.

13. A portable battery jump start as in claim 12, wherein said base pad is formed of EVA foam.

14. A portable battery jump start as in claim 12, further comprising a thin, rigid sheet of planar material resting on top of said bottom panel and beneath said base pad.

15. A portable battery jump start as in claim 1, further comprising:

a buffer pad disposed in said center compartment between said battery and said control module.

16. A portable battery jump start as in claim 15, wherein said buffer pad is formed of EVA foam.

17. A portable battery jump start as in claim 1, wherein each of said first seam, said second seam, said third seam and said fourth seam is a taped seam.

18. A portable battery jump start as in claim 1, wherein said first seal is a watertight seal.

19. A portable battery jump start as in claim 1, wherein said battery is a spill proof battery.

* * * * *